US011032415B1

(12) United States Patent
Retnamma

(10) Patent No.: US 11,032,415 B1
(45) Date of Patent: Jun. 8, 2021

(54) SYSTEM AND METHOD FOR AUDIO CONTENT VERIFICATION

(71) Applicant: Mitel Networks Corporation, Kanata (CA)

(72) Inventor: Venu Retnamma, Kartanaka (IN)

(73) Assignee: Mitel Networks Corporation, Kanata (CA)

(*) Notice: Subject to any disclaimer, the term of this patent is extended or adjusted under 35 U.S.C. 154(b) by 0 days.

(21) Appl. No.: 16/810,712

(22) Filed: Mar. 5, 2020

(51) Int. Cl.
*H04M 1/64* (2006.01)
*H04M 3/42* (2006.01)
*G10L 25/51* (2013.01)
*H04L 9/32* (2006.01)

(52) U.S. Cl.
CPC ......... *H04M 3/42221* (2013.01); *G10L 25/51* (2013.01); *H04L 9/3247* (2013.01); *H04M 2203/303* (2013.01); *H04M 2203/558* (2013.01); *H04M 2203/6027* (2013.01)

(58) Field of Classification Search
CPC ... H04M 3/42221; G10L 25/51; H04L 9/3247
See application file for complete search history.

(56) References Cited

U.S. PATENT DOCUMENTS

| 10,034,029 | B1* | 7/2018 | Barua | H04N 21/2335 |
| 2011/0078172 | A1* | 3/2011 | LaJoie | G06F 16/64 707/769 |
| 2011/0078729 | A1* | 3/2011 | LaJoie | H04N 21/254 725/36 |
| 2011/0261257 | A1* | 10/2011 | Terry | G06K 9/00221 348/515 |
| 2013/0227595 | A1* | 8/2013 | Nielsen | H04N 21/42203 725/11 |
| 2014/0336798 | A1* | 11/2014 | Emerson, III | H04H 60/37 700/94 |
| 2017/0092248 | A1* | 3/2017 | Gozzi | G10H 1/0025 |
| 2017/0092320 | A1* | 3/2017 | Gehring | G11B 27/34 |
| 2019/0348041 | A1* | 11/2019 | Cella | G06F 40/284 |

OTHER PUBLICATIONS

Maher, Robert C., "Lending an Ear in the Courtroom: Forensic Acoustics," Acoustics Today, Summer 2015, vol. 11, Issue 3, pp. 22-29.
Malik et al, "Audio Forensics From Acoustic Reverberation," IEEE International Conference on Acoustics, Speech and Signal Processing IEEE, Mar. 2010.

* cited by examiner

*Primary Examiner* — Simon King

(57) ABSTRACT

Methods and systems for determining a context of recorded audio information and for verifying authenticity of an audio recording are disclosed. Exemplary methods can include mixing signals from the audio communication with metadata modulated using a carrier wave.

20 Claims, 8 Drawing Sheets

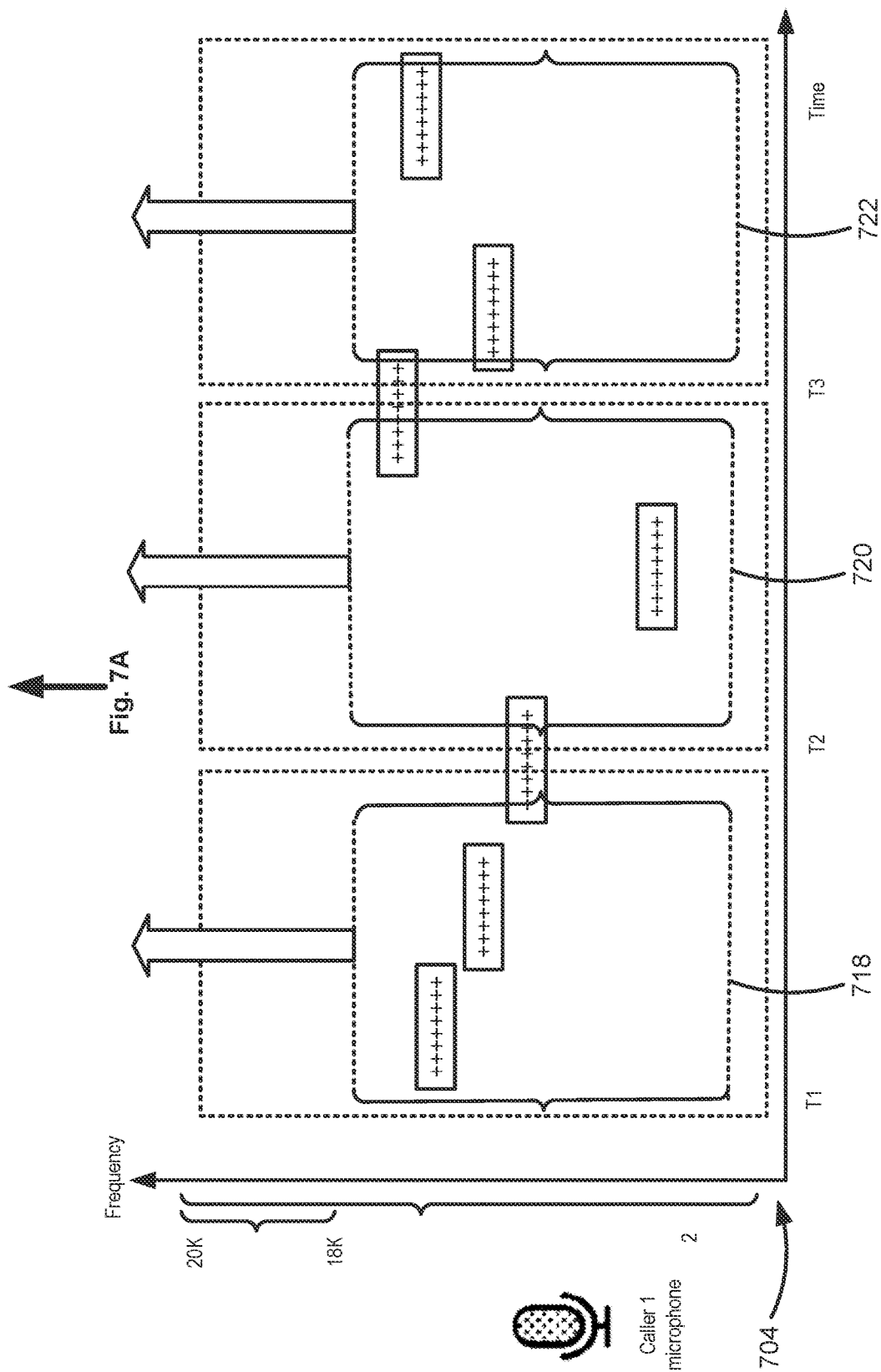

SYSTEM AND METHOD FOR AUDIO CONTENT VERIFICATION

FIELD OF THE INVENTION

The present disclosure generally relates to electronic communication methods and systems. More particularly, examples of the disclosure relate to electronic communication methods and systems suitable for verifying content of a communication.

BACKGROUND OF THE DISCLOSURE

Electronic communication methods and systems allow participants to communicate with one another, even when one or more participants are in remote locations. For example, phone calls and video calls, whether over a public switched telephone network (PSTN), a cellular network, and/or an internet protocol (IP) network, allow remotely located participants to communicate with one another.

During electronic communications, it may be desirable to record at least a portion of the communications. Such recordings can be made for personal use, such as social media, or may be for business purposes, such as to preserve records of conversations—e.g., during a customer service call, during a transaction, or during a meeting. The recordings can be easily shared using platforms, such as email, social media, and the like.

Unfortunately, recordings of electronic communications can be manipulated, intentionally or not, and the manipulated content can be used for nefarious purposes. And, such manipulation of recorded content is thought to be on the rise.

Manipulation of electronic communication recordings may be difficult to detect. Moreover, techniques to modify content of the recordings are becoming increasingly sophisticated, particularly as artificial intelligence (AI) based systems are used to alter the content of recordings.

Current systems to detect tampering with audio recordings typically analyze the acoustical characteristics of speakers, looking at resonance characteristics of the speaker's voice. This traditionally has been used to identify or distinguish a trusted speaker from an unauthorized one and has been used in traditional banking, financial trading, and similar industries. However, such techniques cannot be used to determine whether a recording has been tampered with. Accordingly, improved systems and methods for verifying audio information of a recording are desired.

In addition, multiple transmissions of a recording can make it difficult to determine a context of the communication. Accordingly, improved systems and methods for determining a context of the communication (e.g., from a portion of a recording of the communication) are desired.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIGS. 7A and 7B illustrate recorded audio information in accordance with additional exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems and methods that can be used to verify or detect tampering with originally-recorded material. The originally-recorded material can be initially recorded on a user device or on another device, such as a server that forms part of a cloud-based system. Exemplary systems and methods described herein provide a mechanism to validate an authenticity of a recorded communication by mixing additional recordable information with original audio information to form the originally-recorded material. The additional recordable information can be inaudible to most, if not all, humans. The originally-recorded material can be or include, for example, voicemail, a call recorded at a communication server (e.g., a PBX), or material recorded using a participant device. The additional recordable information can include an ultrasonic sinusoidal wave modulated with a metadata generated at, for example, a communication server at various (e.g., regular) intervals.

In accordance with further examples of the disclosure, since the originally-recorded material can include audio information that includes (modulated) metadata that can include a unique identifier as part of metadata, at various (e.g., regular) intervals, systems and methods described herein can be used for easy identification of call context from a recorded audio segment—e.g., from just a portion of the recorded material.

In addition, exemplary systems and methods can be used to identify any tampering of an audio segment from the original call recording based on the acoustical characteristics of the audio, which is used to create a unique key that is difficult—if not impossible—to counterfeit.

Figure 1:
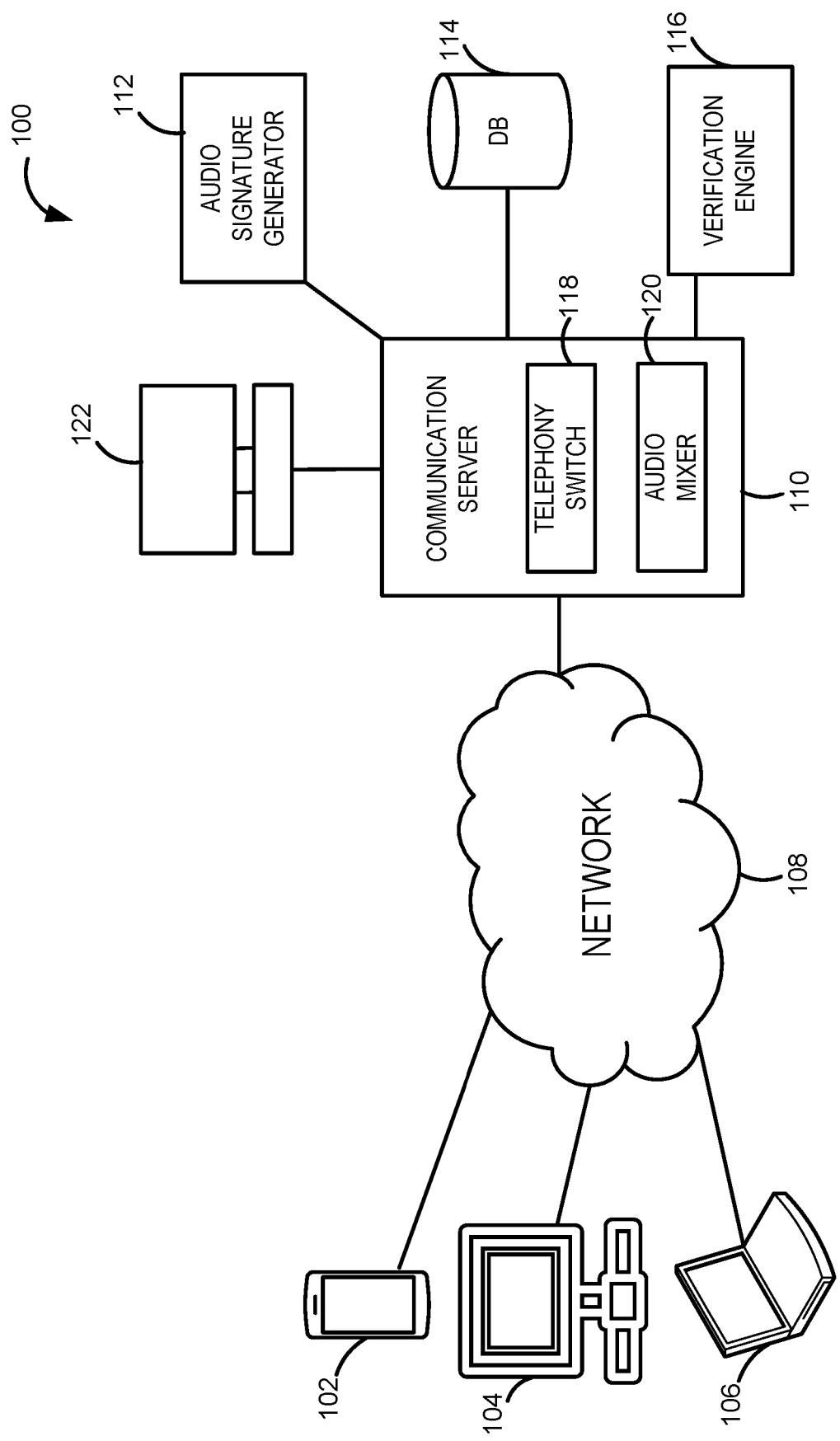
FIG. 1 illustrates an electronic communication system in accordance with exemplary embodiments of the disclosure.

Turning now to the figures, FIG. 1 illustrates an electronic communication system (sometimes referred to herein simply as system) 100 in accordance with exemplary embodiments of the disclosure. System 100 can be used for verifying audio information and/or for determining a context of a communication. For illustration purposes, system 100 is described in the context of recording a communication between participants (also referred to as users) of a communication involving a communication server. However, unless otherwise noted, systems and methods in accordance with embodiments of the disclosure are not so limited. Exemplary systems and methods can be extended to other platforms, where audio communications are generated, transferred, and/or consumed. For example, systems and methods described herein can be used to authenticate video information that includes audio information and determine whether the audio information has been tampered with. Exemplary methods and systems could also be used to detect tampering of voicemail or other recorded information in real time. Further, examples of the disclosure can be used to detect fraudulent audio content in social media platforms by providing an Application Programming Interface (API) for customers and the social media platforms. Further, identification of call context from part of the recorded audio information can enable participants to verify the context of the recorded audio information, even when only a partial segment of the recorded audio information is available.

Electronic communication system 100 can be used to verify recorded material/detect tampering of recorded material by mixing recordable, modulated metadata information with original audio content to form a mixed signal to form the originally-recorded information. Metadata can be extracted from a recording to be verified, and the extracted metadata can be compared to the metadata to determine whether the recording is a true copy of the originally-recorded information.

In the illustrated example, electronic communication system 100 includes one or more participant devices, such as devices 102-106, a network 108, a communication server 110, an audio signature generator 112, a database 114, and a verification engine 116.

Devices 102-106 can be or include any suitable device with wired or wireless communication features and that can connect to network 106. For example, device 102 can include a wearable device, a tablet computer, a wired phone, a mobile phone, a personal (e.g., laptop or desktop) computer, a streaming device, such as a game console or other media streaming device, or the like. One or more of devices 102-106 can include an application or client to perform various functions set forth herein and/or to cause to be transmitted other information as described herein. By way of example, an application or client can include a calling or dialing application that facilitates communication of the one or more devices 102-106 with network 108 and other components of system 100. Further, as described in more detail below, the application or another application on the device can include a recorder to record electronic communication information and/or to verify authenticity of recorded information. Although illustrated as connected to network 108, one or more devices, such as device 122, can be coupled directly to communication server 110.

Network 108 can include or be, for example, an internet protocol (IP) network. Exemplary types of networks suitable for communication with network 108 can be or include a local area network, a wide-area network, a metropolitan area network, one or more wireless networks, or a portion of the Internet. Various components of network 108 can be coupled to one or more other components using an Ethernet connection, other wired connections, and/or wireless interfaces. Network 108 can be coupled to other networks and/or to other devices typically coupled to networks. By way of example, network 108 can be or form part of a public switched telephone network (PSTN) or the Internet.

Communication server 110 can be or form part of an IP-switched communication server. For example, communication server 110 can be or form part of a private branch exchange (PBX) network. The PBX can be associated with an enterprise, such as a business, university, government agency, or the like. Communication server 110 can be located on site—i.e., at a business location, or may be hosted off site—e.g., in the cloud.

As illustrated, communication server 110 includes a telephony switch system 118 to handle routing and switching of calls between, for example, an enterprise, and a telephone network such as network 108. In accordance with examples of the disclosure, telephony switch system 118 connects audio signature generator 112 to a communication, such as a communication involving one or more device 102-106 and/or other devices 122 that may be coupled to communication server 110.

In the illustrated example, communication server 110 also include an audio mixer 120. As described in more detail below, audio mixer 120 can mix recordable information (e.g., modulated metadata) from audio signal generator 112 and one or more devices 102-106, 122 to form a mixed signal. As explained in more detail below, the mixed signal can be recordable—e.g., using a microphone on one on or more of devices 102-106, 122. The mixed signal can include the modulated metadata. The metadata can be extracted from the mixed signal and can be used to verify authenticity of recorded audio information. Although illustrated as part of communication server 110, audio mixer 120 could alternatively form part of another device or system or be a standalone device. Further, although illustrated separately from communication server 110, in some cases, audio signature generator 112 can form part of communication server 110.

Communication server 110, e.g., audio mixer 120 or other component, can also generate digital metadata for a communication. The metadata can include, for example, a unique identification (e.g., a context ID); a time offset code; an audio code—e.g., a hash, and optionally a preamble. The metadata can be transmitted to audio signature generator to form modulated metadata. Modulated metadata can sometimes be referred to simply as metadata.

Audio signature generator 112 generates an identifier that is used to connect audio signature generator 112 to a communication between two or more devices, such as two or more devices 102-106, 122. The context ID can be or include the identifier, such as a unique identification corresponding to a context of a communication. In some cases, the context ID may have more information to identify the context of a communication. Audio signature generator 112 can also generate modulated metadata for the communication.

The time offset code can include a time sequence identification. The audio code can be or include an acoustic hash that corresponds to a previous audio sample in the communication—i.e., the previous segment in a recording having the same unique/context ID. The audio code can be or include the acoustic signature (e.g., acoustic hash) for the audio stream before mixing with metadata information or after mixing with metadata information.

Figure 5:
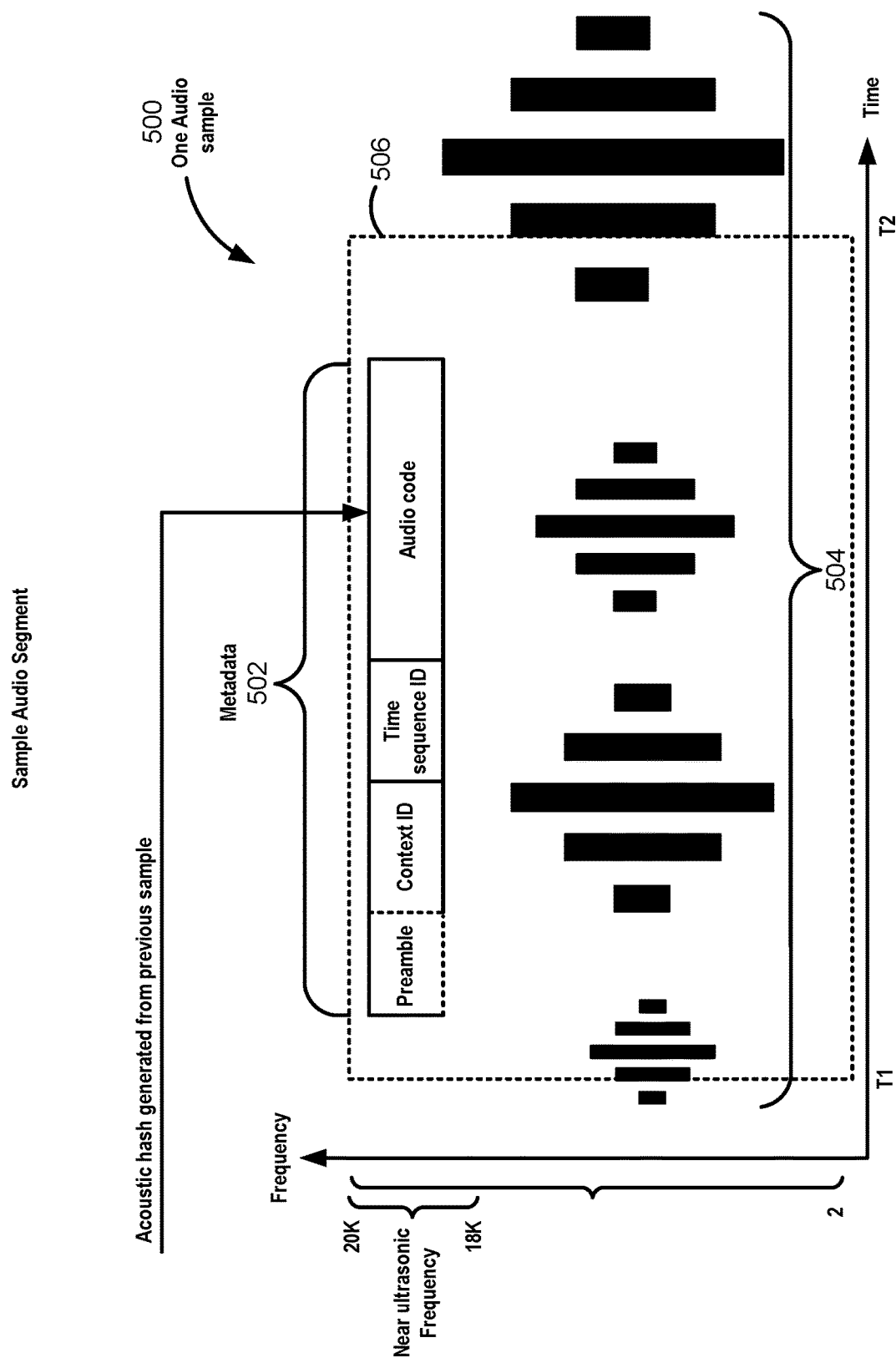
FIG. 5 illustrates a sample audio segment in accordance with further exemplary embodiments of the disclosure.

Sample metadata structure can be, for example, as illustrated below or with an optional preamble, as metadata 502, illustrated in FIG. 5.

| Unique ID/Context ID | Time offset Code | Audio Code (acoustic signature) |
|---|---|---|

Figure 4:
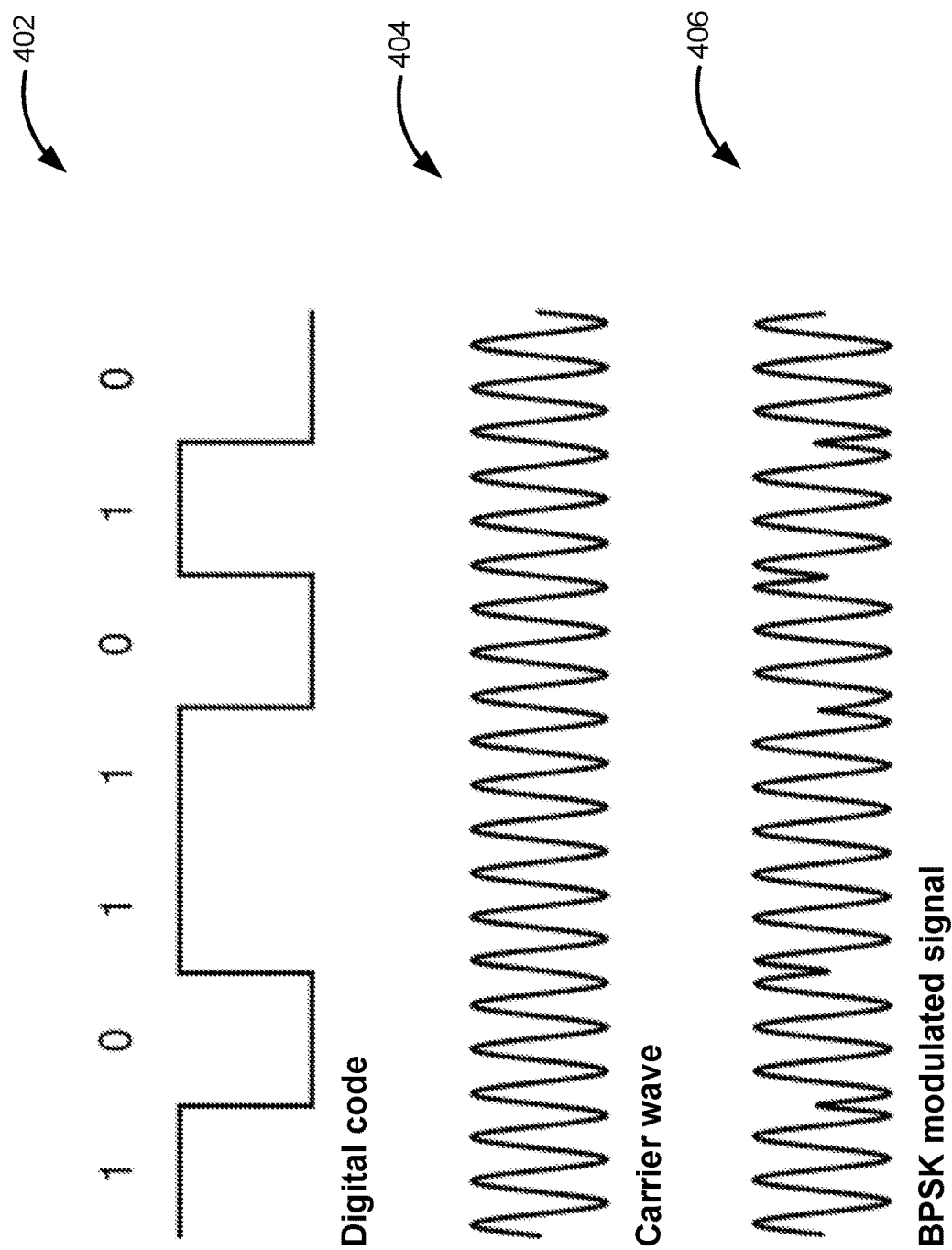
FIG. 4 illustrates a technique for modulating metadata onto a carrier wave in accordance with further exemplary embodiments of the disclosure.

In accordance with various embodiments of the disclosure, digital metadata generated at communication server 110 is modulated with an acoustic carrier wave using audio signature generator 112 for mixing with audio information. FIG. 4 illustrates how a digital data 402 can be converted or modulated into analog data 406 using a carrier wave 404 for mixing with communication information to be recorded. Wave 406 represents a modulated signal that includes the metadata modulated with the carrier wave 404.

In accordance with examples of the disclosure, a frequency of carrier wave 404 can be in the ultrasonic band and range from, for example, about 18 kHz to about 20 kHz or about 18.5 kHz to about 20 kHz. Information in this frequency is recordable by microphones on, for example, devices 102-106, 122, but is inaudible to most, if not all, humans. Thus, no audible interference results from the mixing of the metadata and carrier wave with the audio information. Further, mixing the metadata using carrier waves of about 18 kHz to about 20 kHz or about 18.5 kHz to about 20 kHz facilitates segregating the metadata from a recorded sample using band pass filters.

Database 114 can include one or more devices, such as computers or servers to store metadata and/or information corresponding to the metadata. By way of examples, database 114 can use one or more of Microsoft SQL Server, MySQL, Microsoft Access, Oracle, or the like relational database systems.

Verification engine 116 can include a module to compare information (e.g., metadata or metadata information) from database 114 to metadata or metadata information derived from a recording to be validated to thereby authenticate the recording—or not. Although separately illustrated, verification engine 116 can form part of communication server 110 and/or devices 102-106, 122.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Figure 2:
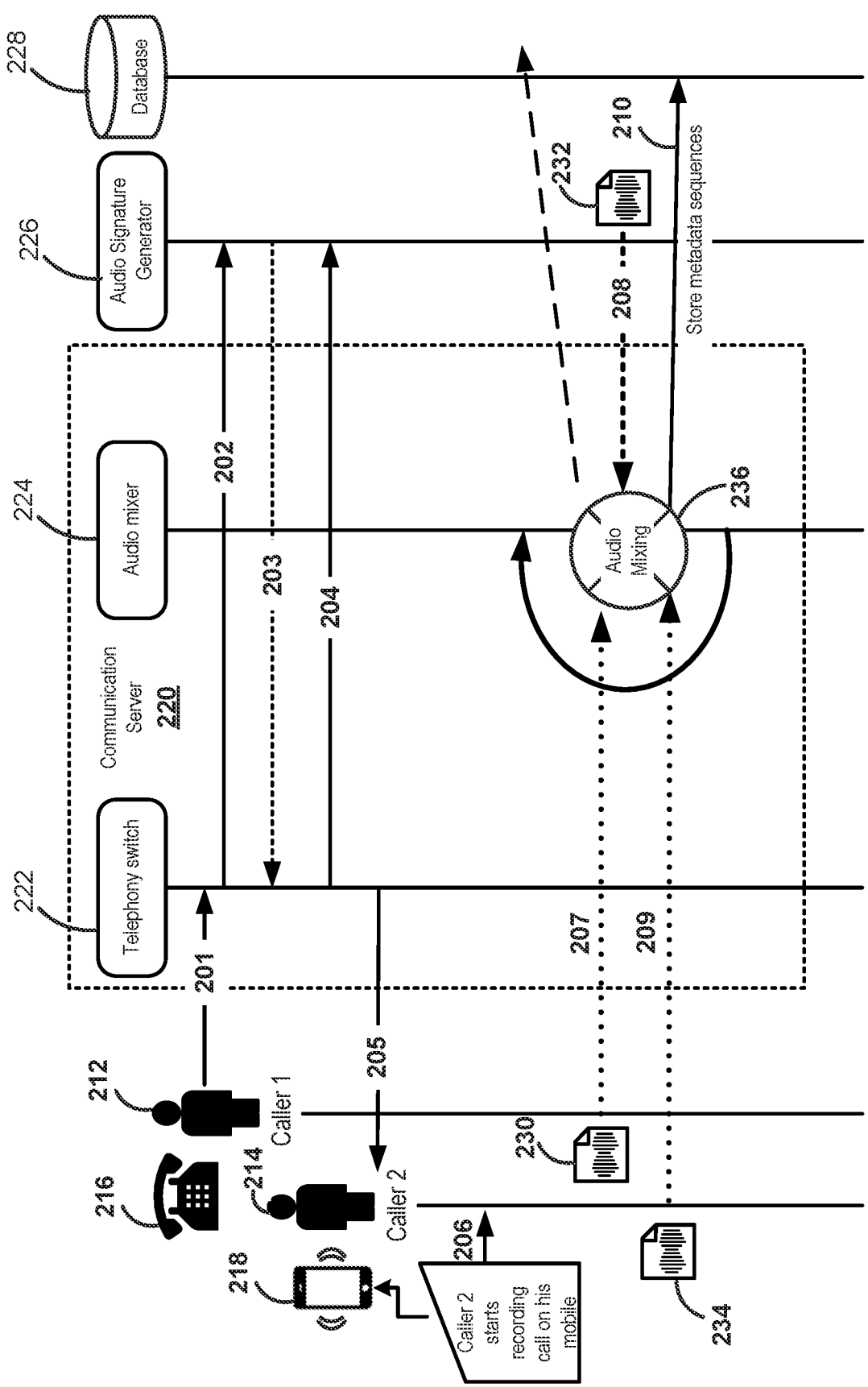
FIG. 2 illustrates a method and system in accordance with exemplary embodiments of the disclosure in greater detail.

Turning now to FIG. 2, a method and system for recording audio information in accordance with various embodiments of the disclosure are illustrated. The system can be the same or similar to system 100. The recording can be between users 212, 214, using devices 216, 218 (which can be the same or similar to any of devices 102-106, 122), respectively. In the illustrated example, an original recording is initially recorded on (user) device 218.

A communication between devices 216 and 218 is established using a communication server 220 (which can be the same or similar to communication server 110), such as a PBX. The communication is initiated at step 201 using device 216 to send a communication request to communication server 220 (e.g., to a telephony switch system 222 of communication server 220)—e.g., by dialing a number, extension, or the like. During step 202, telephony switch system 222 requests an identifier from audio signal generator 226. During step 203, audio signal generator 226 sends the identifier to telephony switch system 222 for a call context. During step 204, telephony switch system 222 initiates a unique audio signature generator session for the communication. At the end of step 204, audio signal generator 226 is connected on the communication established by device 216. At step 205, telephony switch system 222 connects device 218 to the communication. Although illustrated as an audio signature generator joining the communication before other devices join a communication, in accordance with other examples of the disclosure, one or more other devices can join the communication prior to audio signature generator 112 joining the communication.

Once a communication is initiated, one or more users can begin to record the communication. For example, as illustrated, during step 206, device 218 can be used to record the communication using a recording application on device 218. Other devices and/or communication server 220 could also record the communication. During steps 207, 208, and 209, audio information 230 from device 216, audio information 232 from audio signature generator 226, and audio information 234 from device 218 are mixed at audio mixer 236 (which can be the same or similar to audio mixer 120) to form a mixed signal. Audio information 232 can include modulated metadata. During step 210, metadata corresponding to the electronic communication is stored in database 228. Steps 201-210 can be repeated—e.g., at time intervals of, for example about 2, 3, or 5 seconds until the communication is terminated.

Figure 3:
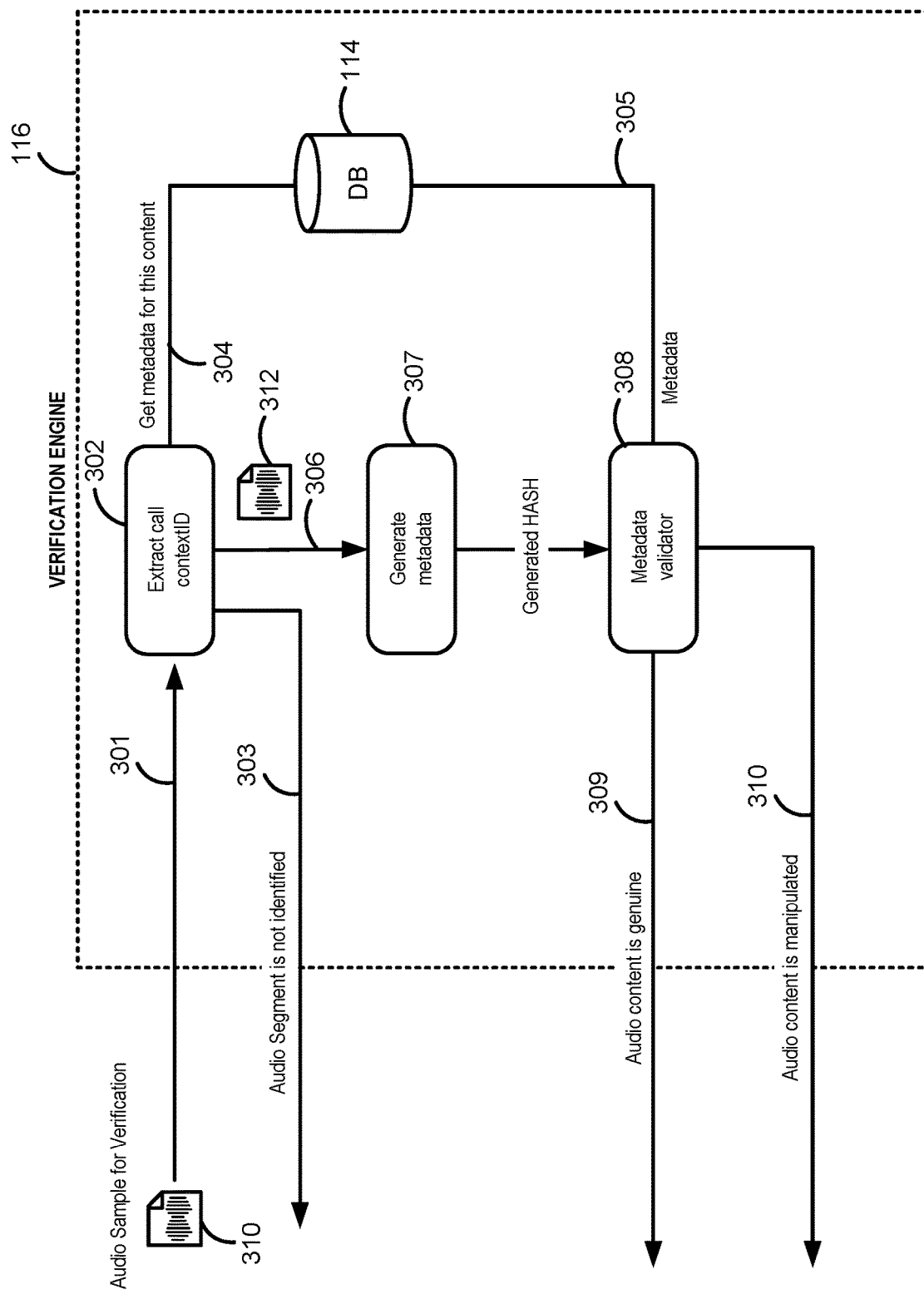
FIG. 3 illustrates a method and system for audio verification in accordance with exemplary embodiments of the disclosure.

FIG. 3 illustrates a method of verifying authenticity of an audio recording 310. Audio recording 310 can have been recorded by a communication server (e.g., communication server 110 or 220), or a device (e.g., device 104-106, 122, 216, 218). At step 301, audio information/recording 310 is sent to verification engine 116. Audio information 310 can have been recorded using a server or a user device and can be a segment of a larger recording. At step 302, verification engine extracts a recorded identifier, which can be or include a unique identification corresponding to a context, from the recording. If an identifier corresponding to the recorded identifier is not found, the audio segment is not identified, and cannot be verified (step 303). In this case, audio information 301 can be discarded and/or marked as not authenticated using a communication server, such as communication server 110, 220. If an identifier corresponding to the recorded identifier is found, metadata previously generated and stored in databases 114 is requested (step 304). In some cases, a time offset may be required. In these cases, if audio information 310 includes a recorded identifier/context ID and a recorded time offset, then the metadata corresponding to the recorded identifier and time offset is requested during step 304.

During step 305, if a valid identifier and optionally a time offset are found in database 114, then the corresponding pre-computed metadata stored for the identifier is retrieved. At step 306, an acoustic signature for audio information 310 is generated and corresponding metadata are generated. At step 308, the generated metadata is compared against stored metadata retrieved from database 114, which can include the sequence matching logic (e.g., time offset code). If all metadata and sequence logic match, the audio sample is found to be genuine (step 309); otherwise, the audio sample is not validated (step 310).

In some cases, it may be desirable to allow for the possibility of of any round trip delay lagging of recordings between a server side and client side recordings. Because of a delay of audio coming from the server to mobile, the same data recorded on server may be leading in time when compared to information recorded on a user device. To handle such situations, verification engine 116 can be configured to accommodate the possibility lagging (typically less than 200 ms). For example, the verification engine can be configured to generate more than one hash from the given sample at different starting offsets (e.g., within a range of about 1 to about 200 ms) and look for at least one of these hash matches with the stored hash to satisfy the authenticity.

As noted above, the metadata can include an acoustic code (which can be or include an acoustic hash) from a previous segment of a recording or a special acoustic hash for the first segment in a recording. The acoustic hash for an audio segment can be calculated based on a variety of factors, including, for example, one or more of pitch contour, mean pitch frequency, formant trajectory, and mean spectrum envelope. The acoustic hash can be generated using any suitable hash technique.

From the pitch contour, such values as mean pitch frequency, difference between the maximum and the minimum frequencies, and the percentage of the pitch difference (max. minus min.) divided by the mean value as calculated can be determined and used to create the acoustic hash.

Mean pitch frequency can vary from, for example, speaker to speaker. Although mean pitch frequency may be a factor in determining an acoustic hash, it may not be ideal as an only factor to determine the acoustic hash.

The use of formant frequencies has played a central role in the development and testing of theories of vowel recognition since popularized by the seminal study of vowels by Peterson and Barney (1952). Over the last 60 years, there have been many different kinds of studies that have established the role of the first two formant frequencies, (F1/F2), as the main determiners of vowel quality (Peterson and Barney, 1952; Fant, 1973; O'Shaughnessy, 1987; Watson and Harrington, 1999; Quatieri, 2002). Such formant frequencies can be used to calculate an acoustic hash.

As a static feature of the resonance characteristics, the mean spectrum envelope can be obtained by averaging the spectral envelopes frame by frame over the entire utterance of speech—e.g., for each speaker in a communication. Such information can be used to generate the acoustic hash.

With reference again to FIG. 5, exemplary metadata 502 includes the following format.

| Preamble | Context ID | Time Sequence ID | Acoustic Code/Hash |

The preamble can include a special least occurring bit pattern to indicate start of a metadata stream. Using a preamble [header] to find the start of data utit, is a well known mechanism in communication field.

The Context ID or identifier can be or include a unique ID to identify one call session from another one. The identifier can include a globally unique identifier (GUID) or any other string that can uniquely identify a communication. In accordance with examples of the disclosure, all metadata for a communication have the same identifier.

A time offset can be a representation to indicate a position of the specified audio sample in the entire recording.

The acoustic hash can be or include any single or combination of encrypted or unencrypted acoustic features of a previous audio sample, such as the features noted above. An acoustic key can be a simple concatenation of selected acoustic features in any specific order or any transformation function applied on top of it. A choice of acoustic features will be considered different features of an audio sample, which makes it virtually impossible to have all the acoustic features matching for a different audio sample. When the metadata sample is the first sample of a call, the acoustic hash can be a special acoustic hash, having a special value, such as an acoustic hash of an audio sample which is above 20K frequency, so that it will not get captured in audio calls—e.g., an acoustic hash of a dog whistle sound.

Referring again to FIG. 5, a segment 506 of a recorded audio sample 500 is illustrated. As shown, segment 506 of a recorded audio sample 500 includes metadata 502 and at least a portion of audio information 504. Audio information 504 can be segmented into sections of (e.g., equal) length (e.g., equal amount of recorded time or data). A length of time or data may vary according to application. However, a length may desirably be long enough to encode the metadata using a carrier wave as described herein.

The acoustic hash can be computed from the whole audio sample or subset of the audio sample. In some cases, the same metadata can be repeated multiple times in one sample if the length of the sample is relatively long.

The metadata generation can occur at the server side during a communication. The audio information can be recorded in a variety of ways, including, for example, (1) during a two party/conference call, when a user initiates a recording on the server side, (2) when a voice call reaches a voice mail box, or (3) when a participant records the communication using a communication device.

Figure 6:
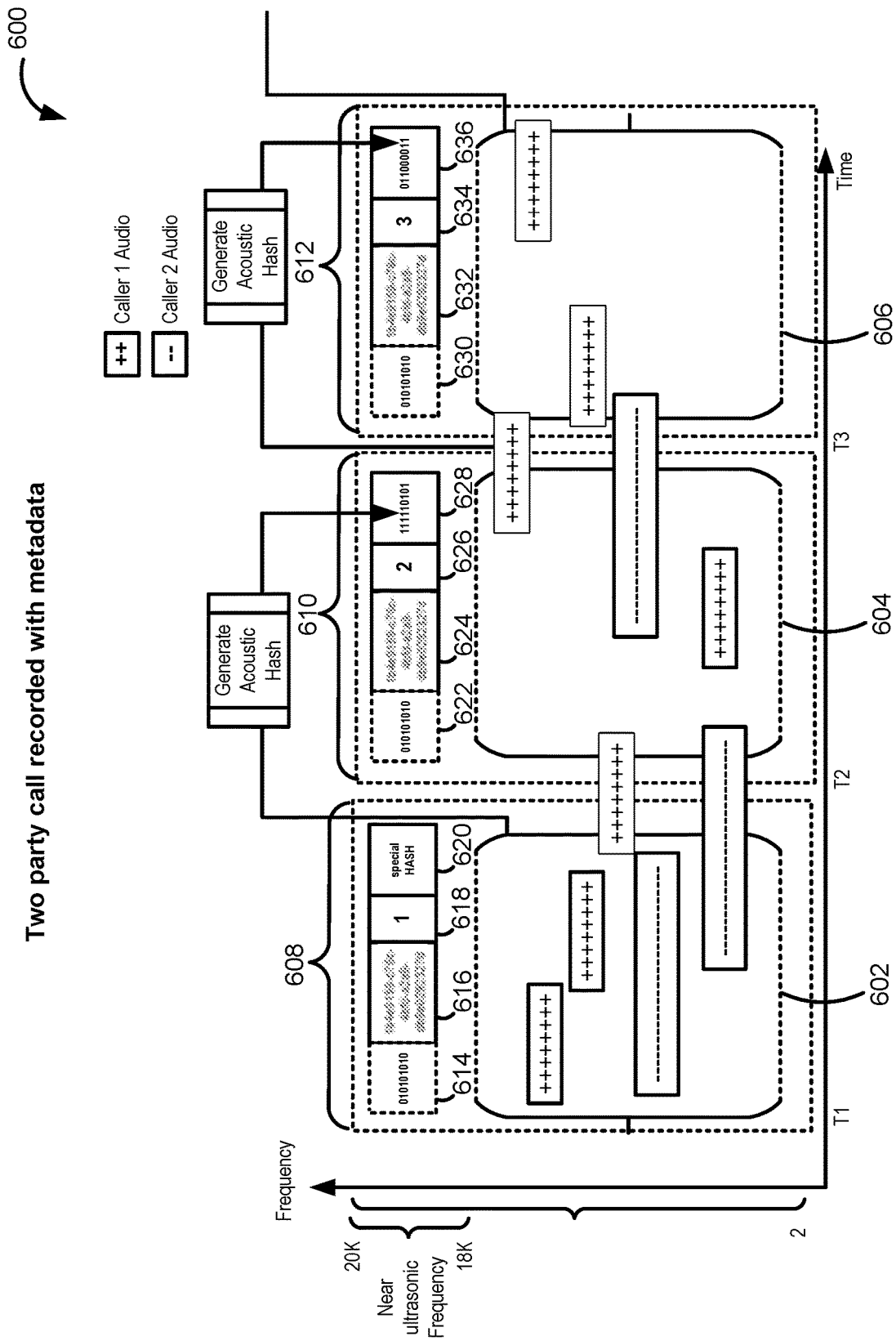
FIG. 6 illustrates recorded audio information in accordance with further exemplary embodiments of the disclosure.

During cases (1) and (2), the server—e.g., communication server 110—mixes participant audio information along with metadata information that includes an acoustic hash computed from a previous audio sample. Here, the previous audio sample can be mixed audio data of all participants' incoming audio with or without any metadata. FIG. 6 shows this use case.

FIG. 6 illustrates recorded information that includes audio segments 602, 604, and 606. Each recorded audio segment 602-604 includes corresponding (e.g., modulated) metadata information 608, 610, and 612. Metadata information 608 includes a preamble 614, an identifier 616, a time sequence ID 618, and an acoustic hash 620. Metadata information 610 includes a preamble 622, an identifier 624, a time sequence ID 626, and an acoustic hash 628. Metadata information 612 includes a preamble 630, an identifier 632, a time sequence ID 634, and an acoustic hash 636. Because there is not an audio segment prior to segment 602, metadata information 608 can include a special acoustic hash as hash 620. Audio segments 602 and 606 include a modulated acoustic hash 628, 636 that is based on a (e.g., the) previous audio segment.

Figure 7A:
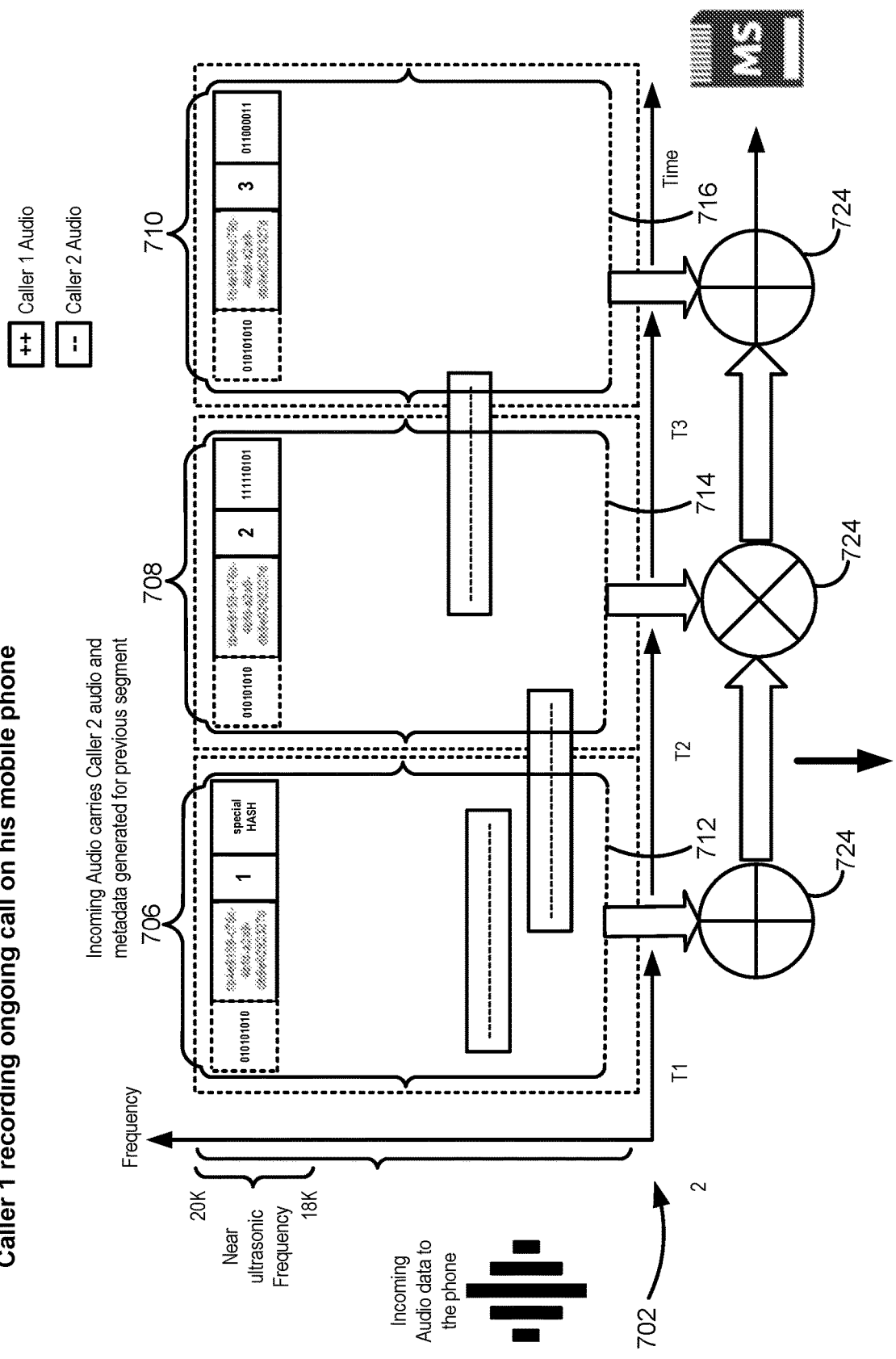

FIGS. 7A and 7B illustrate an example when a participant records an initial recording on a user device. In this case, the mixing of communication and metadata (as modulated by a carrier wave) is performed by using an application (e.g., a recorder) on the user's device (e.g., a device 102-106, 122, 216, 218). Here, the incoming audio information 702 to the user's device carries all parties' audio information, including modulated metadata 706-710. In this case, mixing is done by the external mixer 724 (external to the user's device), and since the incoming audio information 702 already carries metadata (706-710) as part of incoming audio, the metadata automatically gets mixed with audio data 704. Segments 712-716 of audio information 702 can correspond in time to audio segments 718-722 of participant's information captured by a microphone of the participant's device.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. For example, although much of the disclosure relates to verifying a recorded audio communication between two or more devices, exemplary systems and methods can be used for other applications, such as determining a context of a recording from a relatively small sample of the recording. These and other changes or modifications are intended to be included within the scope of the present invention, as expressed in the following claims.

The invention claimed is:

1. A system for verifying audio information, the system comprising:
   a telephony switch system;
   an audio signature generator; and
   an audio signal mixer,
   wherein the audio signature generator generates an identifier,
   wherein the telephony switch system connects the audio signature generator to a communication, and
   wherein the audio mixer receives audio information from at least one communication device and information from the audio signature generator to form a mixed signal.

2. The system of claim 1, wherein the identifier comprises a unique identification corresponding to a context.

3. The system of claim 1, wherein the audio signature generator generates modulated metadata for the communication.

4. The system of claim 3, wherein the modulated metadata is formed using a carrier wave.

5. The system of claim 4, wherein a frequency of a modulated carrier wave is between about 18 kHz and about 20 kHz.

6. The system of claim 3, further comprising a database comprising information corresponding to metadata.

7. The system of claim 6, wherein the metadata comprises the identifier.

8. The system of claim 6, wherein the metadata comprises an acoustic hash.

9. The system of claim 6, wherein the metadata comprises a time sequence identification.

10. An electronic communication method comprising the steps of:
    initiating an audio communication;
    generating an identifier using an audio signature generator;
    creating metadata comprising the identifier;
    mixing signals from the audio communication with modulated metadata to create mixed signal information; and
    storing information corresponding to the metadata.

11. The method of claim 10, wherein the identifier corresponds to a communication context.

12. The method of claim 10, wherein the steps of mixing audio signals, creating metadata, and storing are repeated a number of times during the audio communication.

13. The method of claim 10, further comprising transmitting video information with the audio communication.

14. The method of claim 10, wherein the metadata comprises the identifier, a time offset code, and an acoustic hash.

15. The method of claim 10, further comprising a step of validating a recording.

16. The method of claim 15, wherein the step of validating comprises extracting a recorded identifier from information to be validated.

17. The method of claim 16, wherein, if the recorded identifier comprises a valid identifier, then retrieving information corresponding to the metadata from the database.

18. The method of claim 17, wherein the step of validating comprises generating metadata for the recording.

19. The method of claim 15, wherein the step of validating comprises comparing metadata.

20. A system for verifying audio information, the system comprising:
    a telephony switch;
    an audio signature generator;
    an audio signal mixer;
    a database; and
    a verification engine,
    wherein the audio signature generator generates an identifier,
    wherein the telephony switch connects the audio signature generator to a communication,
    wherein a conference server receives audio information from at least one communication device and information from the audio signature generator to form a mixed signal,
    wherein the database stores the identifier and information corresponding to the metadata, and
    wherein the verification engine verifies an authenticity of a recording.

* * * * *